United States Patent
Stankoski et al.

(10) Patent No.: US 10,764,473 B2
(45) Date of Patent: Sep. 1, 2020

(54) AUTOMATICALLY SYNCHRONIZING MULTIPLE REAL-TIME VIDEO SOURCES

(71) Applicant: Disney Enterprises, Inc., Burbank, CA (US)

(72) Inventors: David A. Stankoski, Brooklyn, NY (US); Frank J. Imbriale, Westwood, NJ (US); Michael J. Strein, Bohemia, NY (US)

(73) Assignee: Disney Enterprises, Inc., Burbank, CA (US)

( * ) Notice: Subject to any disclaimer, the term of this patent is extended or adjusted under 35 U.S.C. 154(b) by 183 days.

(21) Appl. No.: 14/995,420

(22) Filed: Jan. 14, 2016

(65) Prior Publication Data
US 2017/0208220 A1 Jul. 20, 2017

(51) Int. Cl.
*H04N 5/04* (2006.01)
*H04N 5/073* (2006.01)

(52) U.S. Cl.
CPC ................... *H04N 5/0736* (2013.01)

(58) Field of Classification Search
CPC .................................................... H04N 5/0736
See application file for complete search history.

(56) References Cited

U.S. PATENT DOCUMENTS

| | | | | |
|---|---|---|---|---|
| 5,995,518 A * | 11/1999 | Burns | ...................... | H04N 7/14 348/E7.077 |
| 6,710,815 B1 * | 3/2004 | Billmaier | ............... | H04H 20/18 348/485 |
| 7,576,770 B2 * | 8/2009 | Metzger | ............ | G08B 13/19689 348/143 |
| 2004/0227855 A1 * | 11/2004 | Morel | ................ | H04N 5/23203 348/512 |
| 2005/0078711 A1 * | 4/2005 | Stallkamp | .......... | H04N 21/8547 370/503 |
| 2009/0251599 A1 * | 10/2009 | Kashyap | ............... | H04N 21/254 348/500 |
| 2011/0205433 A1 * | 8/2011 | Altmann | ................ | H04N 9/475 348/513 |
| 2011/0279645 A1 * | 11/2011 | Newton | ............... | H04N 13/341 348/43 |
| 2012/0128061 A1 * | 5/2012 | Labrozzi | .......... | H04N 21/23435 375/240.02 |
| 2012/0324520 A1 * | 12/2012 | Van Deventer | ......... | H04L 65/80 725/109 |
| 2013/0271568 A1 * | 10/2013 | Park | ................... | H04N 21/4345 348/43 |

(Continued)

FOREIGN PATENT DOCUMENTS

WO    WO-2013190789 A1 *  12/2013  ......... H04N 21/6125

*Primary Examiner* — Jefferey F Harold
*Assistant Examiner* — Humam M Satti
(74) *Attorney, Agent, or Firm* — Patterson + Sheridan, LLP

(57) ABSTRACT

Systems, methods and computer program products to perform an operation comprising receiving a first video frame specifying a first timestamp from a first video source, receiving a second video frame specifying a second timestamp from a second video source, wherein the first and second timestamps are based on a remote time source, determining, based on a local time source, that the first timestamp is later in time than the second timestamp, and storing the first video frame in a buffer for alignment with a third video frame from the second video source.

27 Claims, 6 Drawing Sheets

(56) References Cited

U.S. PATENT DOCUMENTS

| | | | | |
|---|---|---|---|---|
| 2013/0271657 A1* | 10/2013 | Park | H04N 5/76 | 348/525 |
| 2013/0293677 A1* | 11/2013 | Lee | H04N 21/4345 | 348/43 |
| 2014/0092254 A1* | 4/2014 | Mughal | H04N 21/23438 | 348/158 |
| 2014/0176795 A1* | 6/2014 | Joo | H04H 20/18 | 348/513 |
| 2014/0285621 A1* | 9/2014 | Cheng | H04N 13/0007 | 348/43 |
| 2014/0333836 A1* | 11/2014 | Cho | H04N 7/088 | 348/516 |
| 2015/0046617 A1* | 2/2015 | Shirlen | G06F 13/36 | 710/117 |
| 2015/0052571 A1* | 2/2015 | Stokking | H04N 21/23418 | 725/116 |
| 2015/0109411 A1* | 4/2015 | Lee | H04N 13/0055 | 348/43 |
| 2015/0116451 A1* | 4/2015 | Xu | H04N 7/15 | 348/14.13 |
| 2015/0201198 A1* | 7/2015 | Marlatt | H04N 19/124 | 375/240.03 |
| 2015/0245306 A1* | 8/2015 | Boehlke | H04J 3/0664 | 370/350 |
| 2016/0029052 A1* | 1/2016 | Pinks | H04N 21/23602 | 725/109 |
| 2016/0156950 A1* | 6/2016 | Bangma | H04N 21/4302 | 725/116 |
| 2016/0269771 A1* | 9/2016 | Bangma | H04N 21/23106 | |
| 2017/0272693 A1* | 9/2017 | Strein | H04J 3/0667 | |

\* cited by examiner

| | T = 0 | T = 1 | T = 2 | T = 3 |
|---|---|---|---|---|
| LOCAL TIME (TIME SOURCE 111) | | | | |
| VIDEO SOURCE 102 | FRAME $310_1$ T = 01:23:20:15 | FRAME $311_1$ T = 01:23:20:16 | FRAME $312_1$ T = 01:23:20:17 | FRAME $313_1$ T = 01:23:20:18 |
| VIDEO SOURCE 103 | FRAME $312_2$ T = 01:23:20:17 | FRAME $313_2$ T = 01:23:20:18 | FRAME $314_2$ T = 01:23:20:19 | FRAME $315_2$ T = 01:23:20:20 |

↙ 301

| | T = 0 | T = 1 | T = 2 | T = 3 |
|---|---|---|---|---|
| LOCAL TIME (TIME SOURCE 111) | | | | |
| BUFFER 204 | FRAME $311_1$ T = 01:23:20:16 FRAME $312_2$ T = 01:23:20:17 | FRAME $312_1$ T = 01:23:20:17 FRAME $313_2$ T = 01:23:20:18 | FRAME $313_2$ T = 01:23:20:18 FRAME $314_2$ T = 01:23:20:19 | FRAME $314_2$ T = 01:23:20:19 FRAME $315_2$ T = 01:23:20:20 |

↙ 302

| | T = 0 | T = 1 | T = 2 | T = 3 |
|---|---|---|---|---|
| LOCAL TIME (TIME SOURCE 111) | | | | |
| ALIGNED VIDEO 116 (VIDEO SOURCE 102) | FRAME $310_1$ T = 01:23:20:15 | FRAME $311_1$ T = 01:23:20:16 | FRAME $312_1$ T = 01:23:20:17 | FRAME $313_1$ T = 01:23:20:18 |
| ALIGNED VIDEO 117 (VIDEO SOURCE 103) | FRAME $312_2$ T = 01:23:20:17 | FRAME $312_2$ T = 01:23:20:17 | FRAME $312_2$ T = 01:23:20:17 | FRAME $313_2$ T = 01:23:20:18 |

AUTOMATICALLY SYNCHRONIZING MULTIPLE REAL-TIME VIDEO SOURCES

BACKGROUND

Field of the Disclosure

Embodiments disclosed herein relate to video production. More specifically, embodiments disclosed herein automatically synchronize multiple real-time video sources.

Description of the Related Art

Multiple video cameras are often used to film a single event, such as a movie, television show, or sporting event. Conventionally, the production (e.g., consolidation, combination, and creative manipulation) of these events is completed where the filming occurred. In the production process, the camera, graphics, and replay feeds are combined together to create a single produced signal that is then sent to a single point for distribution (e.g., a broadcast site). Recent advancements have made it possible to bring all the remote signals back to the distribution point individually, allowing the creative production to happen at the distribution point. These different remote signals may be transmitted via a plurality of different travel paths, such as satellite, dedicated fiber, dedicated or shared internet protocol (IP) mediums. Furthermore, the remote signals may be uncompressed or compressed in a variety of ways. The different communications media and compression techniques may introduce varying latencies between the feeds. Therefore, if the feeds are not aligned properly, the resulting production may seem unprofessional.

SUMMARY

In one embodiment, a method comprises receiving a first video frame specifying a first timestamp from a first video source; receiving a second video frame specifying a second timestamp from a second video source, wherein the first and second timestamps are based on a remote time source; determining, based on a local time source, that the first timestamp is later in time than the second timestamp; and storing the first video frame in a buffer for alignment with a third video frame from the second video source.

In another embodiment, a system comprises a processor and a memory containing a program which when executed by the processor performs an operation comprising receiving a first video frame specifying a first timestamp from a first video source, receiving a second video frame specifying a second timestamp from a second video source, wherein the first and second timestamps are based on a remote time source, determining, based on a local time source, that the first timestamp is later in time than the second timestamp, and storing the first video frame in a buffer for alignment with a third video frame from the second video source.

In another embodiment, a computer readable storage medium comprises computer readable program code executable by a processor to perform an operation comprising receiving a first video frame specifying a first timestamp from a first video source, receiving a second video frame specifying a second timestamp from a second video source, wherein the first and second timestamps are based on a remote time source, determining, based on a local time source, that the first timestamp is later in time than the second timestamp, and storing the first video frame in a buffer for alignment with a third video frame from the second video source.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIG. 3 illustrates techniques to automatically synchronize multiple real-time video sources, according to one embodiment.

DETAILED DESCRIPTION

Embodiments disclosed herein provide techniques to align video feeds that have varying latencies. Often, many video cameras are used to film the same event, program, movie, etc. For example, multiple cameras may be configured to capture different angles of a given hole on a golf course. Embodiments disclosed herein facilitate remote production of the video captured by each camera by inserting a timestamp (or timecode) in the data space of each video frame. The timestamps for each video frame are based on a first precision time source. The videos with timestamps may then be transmitted to a remote location, such as a broadcast facility, via any number and type of communications media (such as satellite, Internet, etc.). A receiver at the remote location may automatically align each frame of each video based on the timestamps in each frame relative to a second precision time source. In one embodiment, the receiver may compute a time difference between the timestamp in each frame and a current time of the second precision time source. If two received frames have a time difference that is equal, embodiments disclosed herein may output these frames as part of an aligned video feed for the video feeds that include the frames. However, if the time differences between each frame are different, embodiments disclosed herein may queue faster arriving packets until their corresponding frames from other video feeds arrive. Similarly, when later arriving packets are received, their queued counterpart frames may be dequeued for inclusion in the aligned video feeds.

Figure 1:
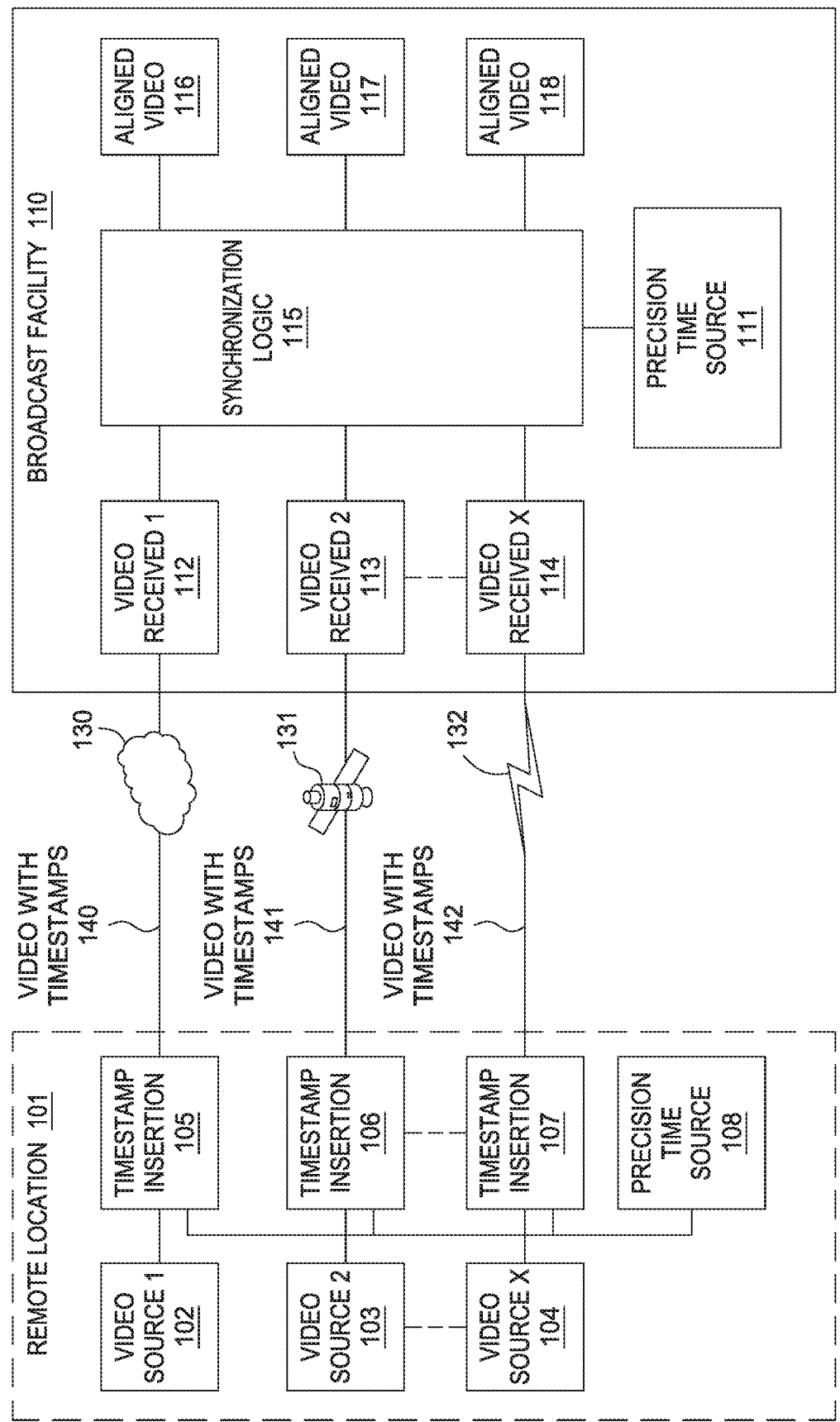
FIG. 1 illustrates a system configured to automatically synchronize multiple real-time video sources, according to one embodiment.

FIG. 1 illustrates a system 100 configured to automatically synchronize multiple real-time video sources, according to one embodiment. As shown, the system 100 generally includes a remote location 101 that is communicably coupled to a broadcast facility 110. The remote location 101 includes a plurality of video sources 102-104. Generally, the video sources 102-104 may be any type of video origination, recording, or playback devices. Although three video sources 102-104, any number and type of video sources may be provided at the remote location 101. In at least one embodiment, the video provided by the video sources 102-104 ultimately needs to be synchronized and time-aligned.

However, as shown, the remote location 101 and broadcast facility 110 are connected via three example data connections 130-132, each of which may introduce varying latencies for each video feed. Therefore, for example, a frame from video source 102 captured at time t=1 may arrive later than a frame from video source 103 at t=1.

As shown, each video source 102-104 is communicably coupled to a timestamp insertion device 105-107. The timestamp insertion devices 105-107 may be under the control of an automation control system. The timestamp insertion devices 105-107 may be referenced to a precision time source 108. The timestamp insertion devices 105-107 may be configured to insert a timestamp (or timecode) into the data space of each frame of video, where each timestamp is based on the precision time source 108. Examples of video data spaces include the vertical ancillary (VANC) data space of a video frame and the horizontal ancillary (HANC) data space of a video frame. In at least one embodiment, the timestamp is formatted using proprietary or standard Data ID (DID) and Secondary Data ID (SDID) identifiers according to processes standardized by the Society of Motion Picture and Television Engineers (SMPTE). One example of a standard to insert a timecode in the VANC or HANC is the SMPTE ST 12M:2008 for carriage in SMPTE 291M DID 60/SDID 60 in the VANC or HANC. In at least one embodiment, the video sources 102-104 capture video at 60 frames per second, resulting in timestamps that are accurate to $\frac{1}{60}^{th}$ of a second being added to the VANC or HANC data space of each video frame. In addition, any of the video sources 102-104 may be in an IP domain. In such embodiments, a video frame (or at least a portion thereof) is encapsulated in an IP packet, and transmitted via the corresponding medium 130-132. Correspondingly, the timestamps may be inserted in the IP packet(s) corresponding to a given frame. For example, the timestamp insertion device 105 may insert a timestamp into an IP frame carrying video data from video source 102.

For example, the video sources 102-104 may be filming a basketball game. As the video sources 102-104 capture video of the basketball game, a timestamp is inserted into each video frame. Because the timestamps inserted at the remote locate 101 are based on the precision time source 108, each video frame has a timestamp that corresponds to the timestamp of the video frames captured at the same time by other video sources. These timestamps may be used by the broadcast facility 110 to ensure that the frames are properly aligned in the final output, even though they may arrive at the broadcast facility 110 at different times.

As shown, once timestamps are inserted into the video from video sources 102-104, the videos with timestamps are transmitted to the broadcast facility 110. As shown, a video with timestamp 140 may correspond to the video from video source 102, and may be transmitted by communications medium 130. Similarly, a video with timestamp 141 may correspond to the video from video source 103, and may be transmitted by communications medium 131, while a video with timestamp 142 may correspond to the video from video source 104, and may be transmitted by communications medium 132. Generally, the videos with timestamps 140-142 may be compressed or uncompressed video streams, which may further introduce varying latency. The communications medium 130-132 may be any type of communications media, such as satellite connections, dedicated or shared Internet Protocol (IP) connections, dedicated fiber connections, microwave connections, land line connections, wireless data connections, and the like.

As shown, the broadcast facility 110 includes a plurality of video receivers 112-114 configured to receive the videos with timestamps 140-142 from the communications media 130-132, respectively. The broadcast facility 110 also includes a synchronization logic 115 and a precision time source 111. The synchronization logic 115 is generally configured to output aligned video feeds 116-118, where the video feeds are aligned in time. When the synchronization logic 115 receives video frames of the videos with timestamps 140-142, the synchronization logic 115 computes, for each frame, a time difference based on the timestamp in each frame and a time produced by the precision time source 111. If the time differences for video frames match, the frames are correctly aligned in time, and are outputted as frames in the aligned video feeds 116-118. However, if the time differences do not match, the synchronization logic 115 may buffer the frames until the corresponding frames are received. Doing so aligns each video with timestamp 140-142 so that they are exactly aligned to a frame-by-frame level. The aligned video feeds 116-118, once created, can be used in a production environment without users having to manually synchronize the videos from the video sources 102-104.

Figure 2:
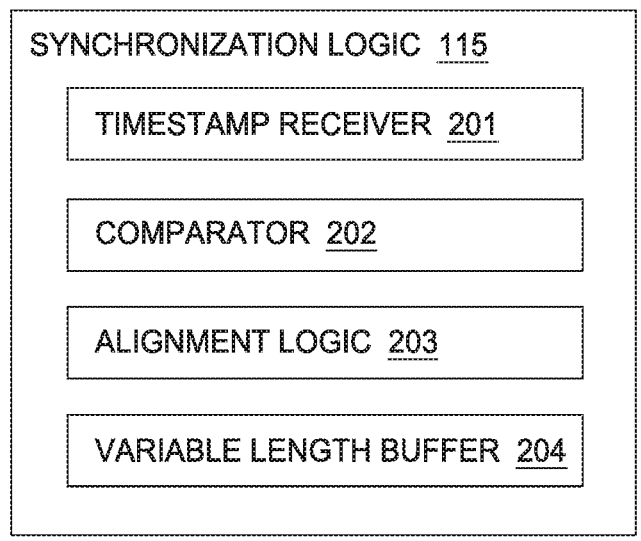
FIG. 2 illustrates components of a synchronization logic, according to one embodiment.

FIG. 2 illustrates components of the synchronization logic 115, according to one embodiment. As shown, the synchronization logic 115 includes a timestamp receiver 201, comparator 202, alignment logic 203, and variable length buffer 204. The timestamp receiver 201 is logic configured to extract timestamps from the VANC (or HANC) data space of each video frame or an IP frame carrying at least a portion of a video frame. The comparator 202 is logic configured to compare timestamps and/or computed time differences of video frames. The alignment logic 203 is logic configured to orchestrate the alignment of a plurality of video feeds with timestamps. The alignment logic 203 may compute time differences for each video frame based on the timestamp in a video frame (or IP frame) relative to a current time produced by the precision time source 111. The alignment logic 203 may place video frames in the variable length buffer 204 when these frames arrive "earlier" in time than their similarly timestamped counterparts. The alignment logic 203 may also remove video frames from the buffer 204 when a companion video frame is received. The variable length buffer 204 may be any type of buffer that can expand or contract in size based on the current offset between two or more video feeds. The buffer 204 may be a first-in-first-out (FIFO) buffer.

FIG. 3 illustrates techniques to automatically synchronize multiple real-time video sources, according to one embodiment. As shown, FIG. 3 depicts three example tables 301-303. Table 301 reflects video frames received by the video receivers 112-113 from video sources 102 and 103 (or corresponding videos with timestamps 140, 141) at example local times T=0, T=1, T=2, and T=3. As shown, the local times T=0, T=1, T=2, and T=3 are based on the time data produced by the precision time source 111, and are therefore "local" to the broadcast facility 110. In at least one embodiment, the local times are timestamps produced by the precision time source 111. The cells of table 301 include a received video frame and the timestamp included in the VANC (or HANC) the received video frame. For example, as shown, at time T=0, video frame $310_1$ of video source 102 is received and has a timestamp of T=01:23:20:15. However, at time T=0, video frame $312_2$ from video source 103 is received with a timestamp of T=01:23:20:17. The synchronization logic 115 may compute time differences between a local time timestamp and the timestamp in each frame $310_1$, $312_2$, and compare the time difference to determine that the video sources 102, 103 are not aligned, and are offset by 2 frames. In another embodiment, the synchronization logic 115 may compare the timestamps to determine that the video sources 102, 103 are not aligned.

Table 302 reflects the contents of the buffer 204. As previously indicated, the buffer 204 is a variable length buffer in that as the time difference between video sources changes, the length (or size) of the buffer also changes. However, the synchronization logic 115 and the buffer 204 operate similarly regardless of the length of the buffer 204. Therefore, in the example depicted in FIG. 3, the video sources are two frames apart, and the buffer 204 is a two frame buffer (having a buffer length of two). However, as the synchronization logic 115 detects changes in time difference between the video sources, the synchronization logic 115 may modify the size of the buffer 204. For example, if the video sources 102, 103 are one frame apart, the synchronization logic 115 may adjust the buffer 204 to be a one frame buffer. Similarly, if the video sources 102, 103 are ten frames apart, the synchronization logic 115 may adjust the buffer 204 to be a ten frame buffer (for a buffer length of ten).

As shown in table 302, at T=0, the buffer 204 includes frame $311_2$, which specifies a timestamp of T=01:23:20:16, and frame $312_2$, which specifies a timestamp T=01:23:20: 17. Video frame $311_2$ may be from video source 103, and was previously placed in the buffer 204 by the synchronization logic 115 based on the timestamp of video frame $311_2$. At time T=1, the buffer 204 includes frames $312_2$ and $313_2$ of video source 103, and so on. At time T=1, when video frame $311_1$ arrives, the synchronization logic 115 may remove its counterpart frame $311_2$ from the buffer 204, and output frames $311_1$ as part of time-aligned video 116.

Table 303 reflects the output of aligned videos 116 and 117. At time T=0, frame $310_1$ is outputted for video source 102 as part of aligned video 116, while frame $312_2$ is outputted for video source 103 as part of aligned video 117. Similarly, at time T=1, frame $311_1$ is outputted for video source 102 as part of aligned video 116, while frame $312_2$ is again outputted for video source 103 as part of aligned video 117. However, as shown, the videos 116, 117 are not synchronized until time T=2, where frames $312_1$ and $312_2$ are outputted (each having timestamps of T=01:23:20:17) as part of their respective aligned videos 116, 117. Therefore, in outputting frame $312_2$ at T=0, T=1, and T=2, the synchronization logic 117 may "hold" frame $312_2$ until the videos 116, 117 are time synchronized. Similarly, at time T=3, frames $313_1$ and $313_2$ having timestamps of T=01:23: 20:18 are outputted. If additional latency occurs later in the transmission of video from each source 102, 103, the synchronization logic 115 may use the buffering techniques depicted in FIG. 3 to re-align the video frames.

Figure 4:
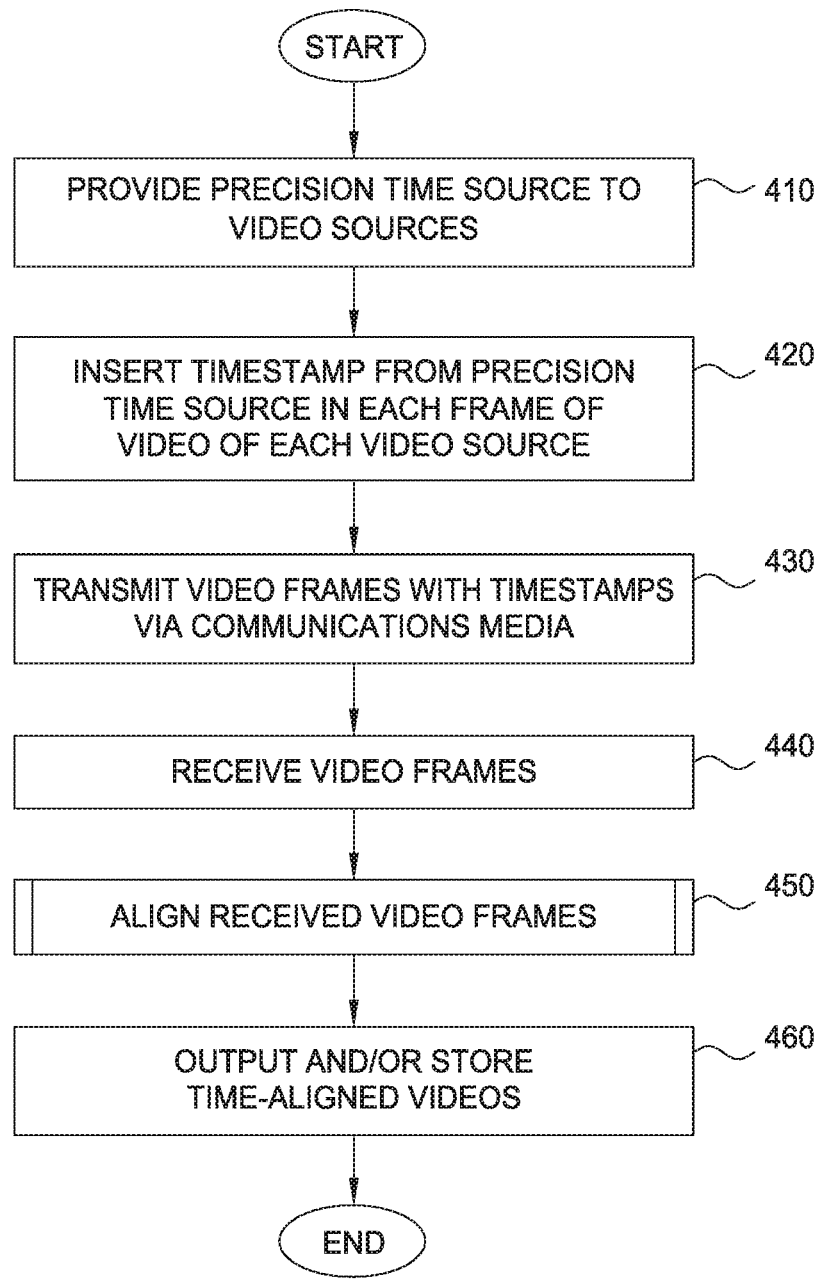
FIG. 4 illustrates a method to automatically synchronize multiple real-time video sources, according to one embodiment.

FIG. 4 illustrates a method 400 to automatically synchronize multiple real-time video sources, according to one embodiment. As shown, the method 400 begins at step 410, where a precision time source is provided to a plurality of video sources, such as the precision time source 108 at remote location 101. At step 420, a timestamp inserter may insert timestamps (or timecodes) from the precision time source into the VANC data space (or HANC data space) of each frame of video outputted by each of the plurality of video sources. As previously indicated, one example way to insert a timecode is the SMPTE standard ST 12M:2008 for carriage in SMPTE 291M DID 60/SDID 60 in the VANC data space or HANC data space. In at least one embodiment, the timestamp or timecode may be inserted into an IP frame encapsulating at least a portion of a video frame. At step 430, the video frames with timestamps may be transmitted via one or more communications media. As previously indicated, the video frames may be compressed or uncompressed. At step 440, the video frames with timestamps are received, for example, at the broadcast facility 110. At step 450, described in greater detail with reference to FIG. 5, the synchronization logic 115 may align the received video frames. Because the different communications media and compression schemes may introduce varying latencies, data frames that were recorded at the same time may not arrive at the same time. As previously indicated, to align the video frames, the synchronization logic 115 computes a time delta (or difference) for each video frame based on the timestamp in each video frame (and/or the IP frame) and the local precision time source. Therefore, the synchronization logic 115 uses various buffering techniques to time-align each of the video frames. At step 460, the synchronization logic 115 may output and/or store the time-aligned videos.

Figure 5:
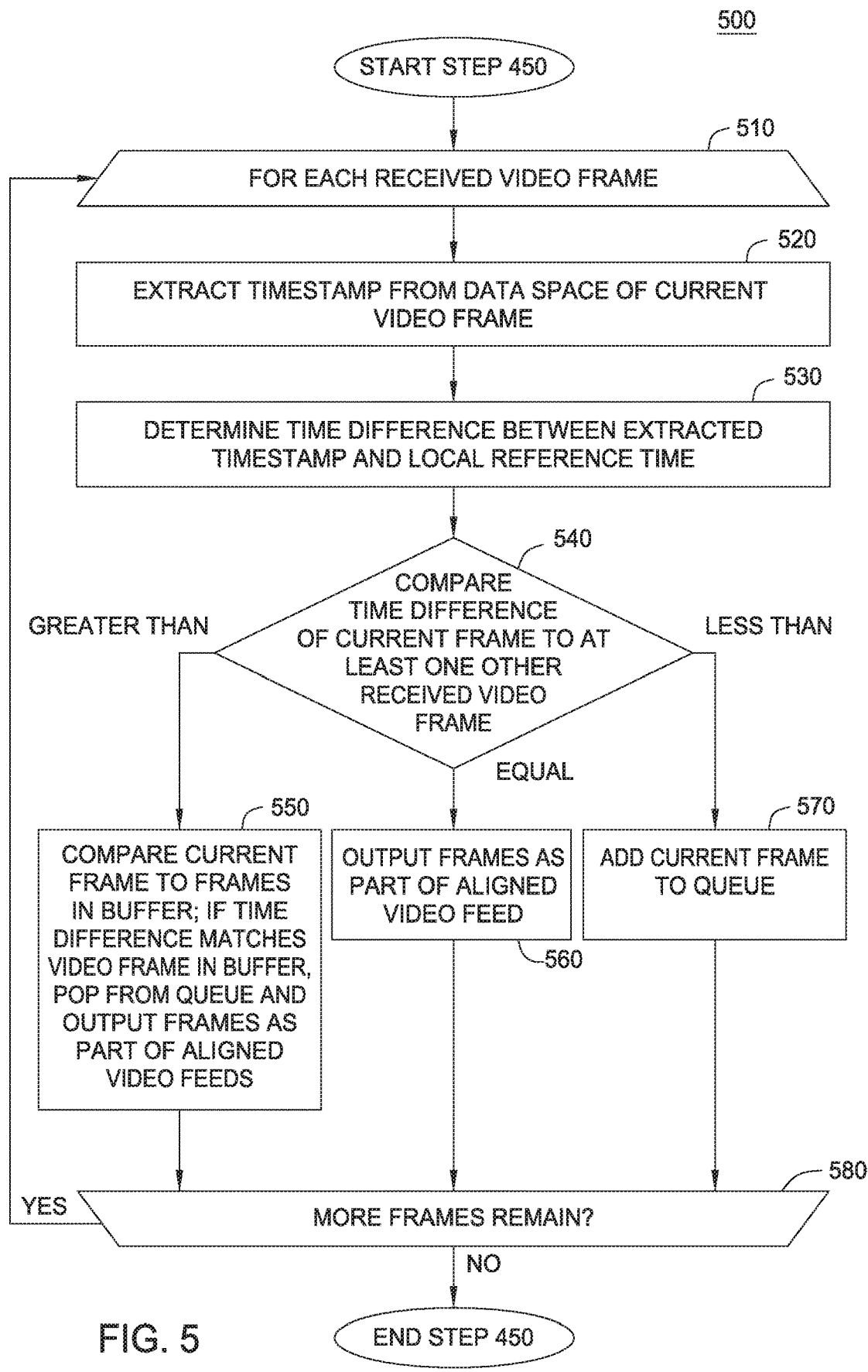
FIG. 5 illustrates a method to align video frames, according to one embodiment.

FIG. 5 illustrates a method 500 corresponding to step 450 to align video frames, according to one embodiment. In at least one embodiment, the synchronization logic 115 performs the steps of the method 500. As shown, the method 500 begins at step 500, where the synchronization logic 115 performs a loop including steps 520-570 for each received video frame with timestamps (or timecodes). At step 520, the synchronization logic 115 may extract the timestamp from the current frame (IP frame and/or video frame). At step 530, the synchronization logic 115 may compute a time difference between the extracted timestamp and the current local reference time. At step 540, the synchronization logic 115 may compare the time difference computed at step 540 to the time difference of at least one other received video frame (and/or IP frame). The at least one video frame may be another video frame from a different video source received at the same time as the current video frame. The at least one video frame may also be a video frame in the buffer 204. If the time difference of the current video frame is greater than the time difference of the at least one other received video frame, the method proceeds to step 550, where the synchronization logic 115 compares the current frame to frames in the buffer. If the time difference of the current frame matches the time difference of frames in the buffer, the synchronization logic 115 may remove those frames from the queue, and output all frames as part of their respective time-aligned video feeds.

Returning to step 540, if the time difference of the current frame is equal to the time difference of at least one other frame, the method proceeds to step 560, where the synchronization logic 115 outputs the frames as part of their respective aligned video feeds. Again returning to step 540, if the synchronization logic 115 determines that the time difference of the current frame is less than at least one other received video frame, the method proceeds to step 570, where the synchronization logic 115 adds the current frame to the queue, as this frame has arrived earlier than at least one other corresponding video frame. At step 580, the synchronization logic 115 determines whether other frames remain. If more frames remain, the method returns to step 510. Otherwise, the method 500 ends.

Figure 6:
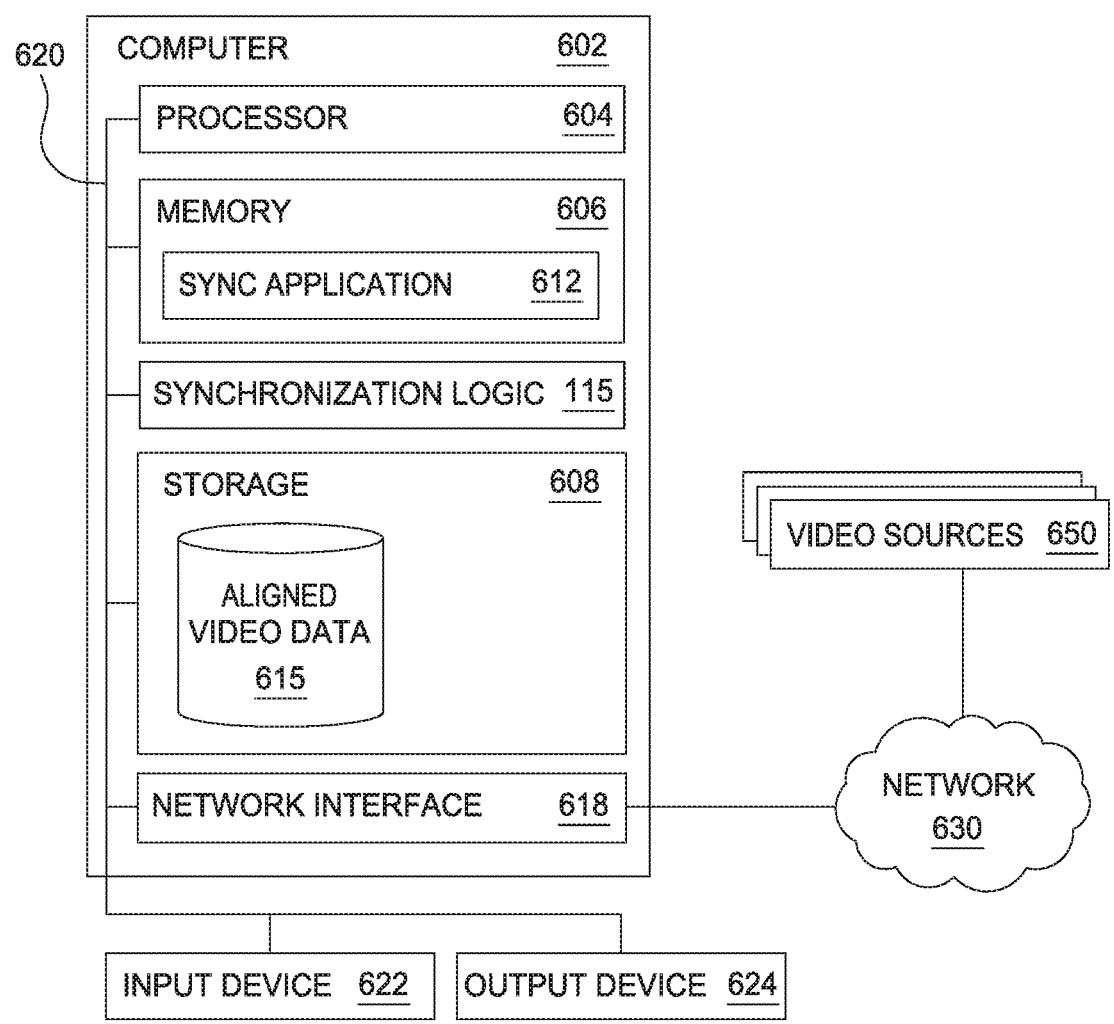
FIG. 6 illustrates a system configured to automatically synchronize multiple real-time video sources, according to one embodiment.

FIG. 6 illustrates a system 600 configured to automatically synchronize multiple real-time video sources, according to one embodiment. The networked system 600 includes a computer 602. The computer 602 may also be connected to other computers via a network 630. In general, the network 630 may be a telecommunications network and/or a wide area network (WAN). In a particular embodiment, the network 630 is the Internet.

The computer 602 generally includes a processor 604 which obtains instructions and data via a bus 620 from a memory 606 and/or a storage 608. The computer 602 may also include the synchronization logic 115, one or more network interface devices 618, the input devices 622, and output devices 624 connected to the bus 620. The computer 602 is generally under the control of an operating system (not shown). Examples of operating systems include the UNIX operating system, versions of the Microsoft Windows operating system, and distributions of the Linux operating system. More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

As shown, the memory 606 includes the sync application 612, which is a software embodiment of the synchronization logic 115. Generally, the sync application 612 may provide all functionality described above with reference to FIGS. 1-5. The storage 608 includes the aligned video data 615, which stores time-aligned video feeds created by the synchronization logic 115 and/or the sync application 612.

In the foregoing, reference is made to embodiments of the disclosure. However, it should be understood that the disclosure is not limited to specific described embodiments. Instead, any combination of the recited features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the recited aspects, features, embodiments and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the sync application 612 could execute on a computing system in the cloud and produce time-aligned video feeds. In such a case, the sync application 612 could store the time-aligned video feeds at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method of synchronizing multiple real-time video sources, the computer-implemented method comprising:

receiving a first video frame as part of a first video feed from a first video source, the first video frame having an associated data space specifying a first timestamp generated by a first one of a plurality of timestamp insertion devices collectively referenced to a remote time source;

receiving, as part of a second video feed from a second video source, an Internet Protocol (IP) frame that encapsulates (i) at least part of a second video frame and (ii) a second timestamp generated by a second one of the plurality of timestamp insertion devices, wherein the first and second video sources are configured to concurrently film a common scene from distinct viewing perspectives, wherein the first and second video frames are received with distinct measures of latency introduced by distinct types of transmissions media, respectively;

determining that the first timestamp is later in time than the second timestamp by operation of one or more computer processors and based on comparing (i) a first difference between the first timestamp and a current time provided by a local time source and (ii) a second difference between the second timestamp and the current time provided by the local time source;

queuing the first video frame in a variable-length buffer until a third video frame, specifying a third timestamp equal to the first timestamp, is received from the second video source, the variable-length buffer having a length that varies over time based on a count of frames by which the first and second video feeds are currently offset relative to one another; and aligning the first and second video feeds in time relative to one another, based on the variable-length buffer, whereafter the first and second video feeds are concurrently output via a single transmissions medium.

2. The computer-implemented method of claim 1, further comprising:

outputting the first video frame as part of the aligned first video feed; and outputting the third video frame as part of the aligned second video feed, wherein the first and third video frames are aligned in time.

3. The computer-implemented method of claim 1, wherein determining that the first timestamp is later in time than the second timestamp further comprises:

computing the first difference between the current time of the local time source and the first timestamp;

computing the second difference between the current time of the local time source and the second timestamp; and determining that the second difference is greater than the first difference.

4. The computer-implemented method of claim 1, wherein the first video source comprises a first video capture device, wherein the second video source comprises a second video capture device, wherein the first and second video capture devices are of a plurality of video capture devices configured to film the common scene.

5. The computer-implemented method of claim 1, wherein the first video frame is of a plurality of video frames received from the first video source, wherein the second and third video frames are of a plurality of frames received from the second video source, wherein the plurality of frames received from the first video source are received through a first transmissions medium, wherein the plurality of video frames received from the second video source are received through a second transmissions medium, different than the first transmissions medium.

6. The computer-implemented method of claim 1, wherein the variable-length buffer comprises a first-in first-out buffer.

7. The computer-implemented method of claim 1, wherein the first video frame has a first latency value, and wherein the second video frame has a second latency value, different than the first latency value.

8. The computer-implemented method of claim 1, wherein the computer-implemented method is performed by synchronization logic having at least one of an extractor component, a comparator component, an alignment component, or a buffer component.

9. The computer-implemented method of claim 1, wherein the first and second timestamps are based on the remote time source, and wherein the computer-implemented method further comprises:

extracting the first timestamp from the associated data space of the first video frame; and extracting the second timestamp from the IP frame;

wherein the associated data space of the first video frame comprises at least one of a vertical ancillary (VANC) data space or a horizontal ancillary (HANC) data space.

10. A computer program product to synchronize multiple real-time video sources, the computer program product comprising:

a non-transitory computer-readable medium having computer-readable program code embodied therewith, the computer-readable program code executable by one or more computer processors to perform an operation comprising:

receiving a first video frame as part of a first video feed from a first video source, the first video frame having an associated data space specifying a first timestamp generated by a first one of a plurality of timestamp insertion devices collectively referenced to a remote time source;

receiving, as part of a second video feed from a second video source, an Internet Protocol (IP) frame that encapsulates (i) at least part of a second video frame and (ii) a second timestamp generated by a second one of the plurality of timestamp insertion devices, wherein the first and second video sources are configured to concurrently film a common scene from distinct viewing perspectives, wherein the first and second video frames are received with distinct measures of latency introduced by distinct types of transmissions media, respectively;

determining that the first timestamp is later in time than the second timestamp, based on comparing (i) a first difference between the first timestamp and a current time provided by a local time source and (ii) a second difference between the second timestamp and the current time provided by the local time source;

queuing the first video frame in a variable-length buffer until a third video frame, specifying a third timestamp equal to the first timestamp, is received from the second video source, the variable-length buffer having a length that varies over time based on a count of frames by which the first and second video feeds are currently offset relative to one another; and aligning the first and second video feeds in time relative to one another, based on the variable-length buffer, whereafter the first and second video feeds are concurrently output via a single transmissions medium.

11. The computer program product of claim 10, the operation further comprising:

outputting the first video frame as part of the aligned first video feed; and outputting the third video frame as part of the aligned second video feed, wherein the first and third video frames are aligned in time.

12. The computer program product of claim 10, wherein determining that the first timestamp is later in time than the second timestamp further comprises:

computing the first difference between the current time of the local time source and the first timestamp;

computing the second difference between the current time of the local time source and the second timestamp; and determining that the second difference is greater than the first difference.

13. The computer program product of claim 10, wherein the first video source comprises a first video capture device, wherein the second video source comprises a second video capture device, wherein the first and second video capture devices are of a plurality of video capture devices configured to film the common scene.

14. The computer program product of claim 10, wherein the first video frame is of a plurality of video frames received from the first video source, wherein the second and third video frames are of a plurality of frames received from the second video source, wherein the plurality of frames received from the first video source are received through a first transmissions medium, wherein the plurality of video frames received from the second video source are received through a second transmissions medium, different than the first transmissions medium.

15. The computer program product of claim 10, wherein the variable-length buffer comprises a first-in first-out buffer.

16. The computer program product of claim 10, wherein the first video frame has a first latency value, and wherein the second video frame has a second latency value, different than the first latency value.

17. The computer program product of claim 10, wherein the operation is performed by synchronization logic having at least one of an extractor component, a comparator component, an alignment component, or a buffer component.

18. The computer program product of claim 10, wherein the first and second timestamps are based on the remote time source, and wherein the operation further comprises:

extracting the first timestamp from the associated data space of the first video frame; and extracting the second timestamp from the IP frame;

wherein the associated data space of the first video frame comprises at least one of a vertical ancillary (VANC) data space or a horizontal ancillary (HANC) data space.

19. A system of synchronizing multiple real-time video sources, the system comprising:
one or more computer processors; and
a memory containing a program which, when executed by the one or more computer processors, performs an operation comprising:
receiving a first video frame as part of a first video feed from a first video source, the first video frame having an associated data space specifying a first timestamp generated by a first one of a plurality of timestamp insertion devices collectively referenced to a remote time source;
receiving, as part of a second video feed from a second video source, an Internet Protocol (IP) frame that encapsulates (i) at least part of a second video frame and (ii) a second timestamp generated by a second one of the plurality of timestamp insertion devices, wherein the first and second video sources are configured to concurrently film a common scene from distinct viewing perspectives, wherein the first and second video frames are received with distinct measures of latency introduced by distinct types of transmissions media, respectively;
determining that the first timestamp is later in time than the second timestamp based on comparing (i) a first difference between the first timestamp and a current time provided by a local time source and (ii) a second difference between the second timestamp and the current time provided by the local time source;
queuing the first video frame in a variable-length buffer until a third video frame, specifying a third timestamp equal to the first timestamp, is received from the second video source, the variable-length buffer having a length that varies over time based on a count of frames by which the first and second video feeds are currently offset relative to one another; and
aligning the first and second video feeds in time relative to one another, based on the variable-length buffer, whereafter the first and second video feeds are concurrently output via a single transmissions medium.

20. The system of claim 19, the operation further comprising:
outputting the first video frame as part of the aligned first video feed; and
outputting the third video frame as part of the aligned second video feed, wherein the first and third video frames are aligned in time.

21. The system of claim 19, wherein determining that the first timestamp is later in time than the second timestamp further comprises:
computing the first difference between the current time of the local time source and the first timestamp;
computing the second difference between the current time of the local time source and the second timestamp; and
determining that the second difference is greater than the first difference.

22. The system of claim 19, wherein the first video source comprises a first video capture device, wherein the second video source comprises a second video capture device, wherein the first and second video capture devices are of a plurality of video capture devices configured to film the common scene.

23. The system of claim 19, wherein the first video frame is of a plurality of video frames received from the first video source, wherein the second and third video frames are of a plurality of frames received from the second video source, wherein the plurality of frames received from the first video source are received through a first transmissions medium, wherein the plurality of video frames received from the second video source are received through a second transmissions medium, different than the first transmissions medium.

24. The system of claim 19, wherein the variable-length buffer comprises a first-in first-out buffer.

25. The system of claim 19, wherein the first video frame has a first latency value, and wherein the second video frame has a second latency value, different than the first latency value.

26. The system of claim 19, wherein the operation is performed by synchronization logic having at least one of an extractor component, a comparator component, an alignment component, or a buffer component.

27. The system of claim 19, wherein the first and second timestamps are based on the remote time source, and wherein the operation further comprises:
extracting the first timestamp from the associated data space of the first video frame; and
extracting the second timestamp from the IP frame,
wherein the associated data space of the first video frame comprises at least one of a vertical ancillary (VANC) data space or a horizontal ancillary (HANC) data space.

* * * * *

UNITED STATES PATENT AND TRADEMARK OFFICE
CERTIFICATE OF CORRECTION

PATENT NO. : 10,764,473 B2
APPLICATION NO. : 14/995420
DATED : September 1, 2020
INVENTOR(S) : David A. Stankoski et al.

It is certified that error appears in the above-identified patent and that said Letters Patent is hereby corrected as shown below:

In the Claims

In Column 13, Line 28, in Claim 19, after "timestamp" insert -- , --.

Signed and Sealed this
Tenth Day of November, 2020

Andrei Iancu
*Director of the United States Patent and Trademark Office*